United States Patent
Kraynak et al.

(10) Patent No.: US 9,772,988 B2
(45) Date of Patent: Sep. 26, 2017

(54) FINDING UNIQUE FORMULA SETS IN SPREADSHEETS

(71) Applicant: MICROSOFT TECHNOLOGY LICENSING, LLC, Redmond, WA (US)

(72) Inventors: Steven Paul Kraynak, Sammamish, WA (US); Mark Alan Mullins, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 306 days.

(21) Appl. No.: 14/634,574

(22) Filed: Feb. 27, 2015

(65) Prior Publication Data
US 2016/0253307 A1   Sep. 1, 2016

(51) Int. Cl.
G06F 17/24   (2006.01)
G06F 17/25   (2006.01)

(52) U.S. Cl.
CPC .................. G06F 17/246 (2013.01)

(58) Field of Classification Search
CPC .................................... G06F 17/246
See application file for complete search history.

(56) References Cited

U.S. PATENT DOCUMENTS

| | | | |
|---|---|---|---|
| 5,255,356 A | 10/1993 | Michelman | |
| 6,256,649 B1 | 7/2001 | Mackinlay et al. | |
| 6,990,480 B1 | 1/2006 | Burt | |
| 2006/0015805 A1* | 1/2006 | Humenansky | G06F 17/246 715/209 |
| 2006/0224946 A1 | 10/2006 | Barrett | |
| 2007/0011211 A1* | 1/2007 | Reeves | G06F 17/246 |
| 2009/0044092 A1 | 2/2009 | Rapp | |
| 2009/0083615 A1 | 3/2009 | Kotler et al. | |
| 2010/0049565 A1 | 2/2010 | Aebig et al. | |
| 2010/0049746 A1* | 2/2010 | Aebig | G06Q 10/10 705/7.41 |
| 2010/0050264 A1* | 2/2010 | Aebig | G06F 21/577 726/25 |
| 2010/0180220 A1 | 7/2010 | Becerra | |
| 2011/0055681 A1 | 3/2011 | Smialek et al. | |
| 2011/0314365 A1* | 12/2011 | Messerly | G06F 17/246 715/219 |
| 2014/0108899 A1 | 4/2014 | Brissette et al. | |

OTHER PUBLICATIONS

"International Search Report and Written Opinion for PCT Application PCT/US2016/019434" Mailed Date: May 9, 2016, 11 pages.
(Continued)

*Primary Examiner* — James J Debrow
(74) *Attorney, Agent, or Firm* — Workman Nydegger (57) ABSTRACT

Spreadsheets include cells arranged in rows and columns and various formulas contained within one or more of the cells. Systems and methods are provided for identifying and utilizing functionally unique formulas within the spreadsheets, as well as corresponding unique formula sets. Unique formula sets are identified by determining one or more arrangements of rectangular ranges of contiguous cells that contain the functionally unique formulas. The unique formula sets can be marked for subsequent reference and can be highlighted for visual inspection.

22 Claims, 9 Drawing Sheets

(56) References Cited

OTHER PUBLICATIONS

International Preliminary Report on Patentability issued in PCT Application No. PCT/US2016/019434 mailed Jan. 18, 2017.
"How to Create a List of Unique Formulas in an Excel Workbook", Published on: Jul. 1, 2014, Available at: http://spreadsheet1.com/how-to-create-a-list-of-unique-formulas-in-an-excel-workbook.html.
Hermans, et al, "Detecting Code Smells in Spreadsheet Formulas", In Techinical Report TUD-SERG-2011-030, Retrieved on: Apr. 29, 2013, 14 pages.
Hermans, Felienne, "Improving Spreadsheet Test Practices", In Proceedings of the Conference of the Center for Advanced Studies on Collaborative Research, Nov. 18, 2013, 15 pages.
"How do I Mass Update Formulas on a Spreadsheet Tab?", Retrieved on: Nov. 28, 2014, Available at: https://productforums.google.com/forum#!topic/docs/H2ff3-FWeak.
"Excel Bulk Update All Array Formulas in the Worksheet", Retrieved on: Nov. 28, 2014, Available at: http://stackoverflow.com/questions/26885956/excel-bulk-update-all-array-formulas-in-the-worksheet.
"Savvy Maps", Published on: Jun. 16, 2006, Available at: http://www.xlsavvy.com/savvymaps.php#.VHhU1PQW31E.
Mhickey, "Office", Published on: May 1, 2012, Available at: http://answers.microsoft.com/en-us/office/forum/office_2010-excel/is-ther-a-way-to-count-the-number-of-formulas-in-a/6528244b-f312-4da2-ab74-8505aad60d57.
Hermans, et al, "Detecting and Refactoring Code Smells in Spreadsheet Formula", In Techinical Report TUD-SERG-2013-022, Retrieved on: Dec. 5, 2014, 34 pages.
Powell, et al.,"An Auditing Protocol for Spreadsheet Models", In Journal of Information and Management, vol. 45, Issue 5, Nov. 27, 2007, 44 pages.
"Example Incisive.Online Spreadsheet Analysis", Published on: Aug. 8, 2013, Available at: http://www.incisive.com/documentation/example-incisiveonline-spreadsheet-analysis.
Sestoft, Peter, "A Spreadhseet Core Implementation in C#" Version 1.0 of Sep. 28, 2006, Sep. 2006, 138 pages.
Yoder, Alan G., et al., "Domain-Specific and General-Purpose Aspects of Spreadsheet Languages", 1997, 11 pages.
Lecky-Thompson, Guy, "How to Loop in Cell Range in Excel—Three Ways to Iterate Over Ranges Using MS Visual Basic for XL", Mar. 22, 2007, 4 pages.
Buckyball, Ehow Member, "How to iterate (loop) in an Excel spreadheet", Based on information and belief available, at least as early as Apr. 16, 2010, 3 pages.
Algorithms, "Directed Graphs", Based on information and belief available, at least as early as Apr. 16, 2010, 6 pages.
Office Action dated Mar. 29, 2012 cited in U.S. Appl. No. 12/817,456.

* cited by examiner

*Figure 1*

A1 Reference Style  210      220           230            240

|  | A | B | C | D | E | F |
|---|---|---|---|---|---|---|
| 1 | 5 | 12 |  | 8 |  | 32 |
| 2 | =A1+1 | =B1+1 |  | =D1+1 |  | =F1+1 |
| 3 | =A2+1 | =B2+1 |  | =D2+1 |  |  |
| 4 | =A3+1 | =B3+1 |  | =D3+1 |  | =F2+1 |
| 5 | =A4+1 | =B4+1 |  | =D4+1 |  |  |
| 6 | =A5+1 | =B5+1 |  | =D5+1 |  | =F4+1 |
| 7 | =A6+1 | =B6+1 |  | =D6+1 |  |  |
| 8 | =A7+1 | =B7+1 |  | =D7+1 |  | =F6+1 |
| 9 | =A8+1 | =B8+1 |  | =D8+1 |  |  |
| 10 | =A9+1 | =B9+1 |  | =D9+1 |  | =F8+1 |
| 11 | =SUM (A1:A10) | =SUM (B1:B10) |  | =SUM (D1:D10) |  | =SUM (F1:F10) |

|  | A | B | C | D | E | F |
|---|---|---|---|---|---|---|
| 1 | 5 | 12 |  | 8 |  | 32 |
| 2 | 6 | 13 |  | 9 |  | 33 |
| 3 | 7 | 14 |  | 10 |  |  |
| 4 | 8 | 15 |  | 11 |  | 34 |
| 5 | 9 | 16 |  | 12 |  |  |
| 6 | 10 | 17 |  | 13 |  | 35 |
| 7 | 11 | 18 |  | 14 |  |  |
| 8 | 12 | 19 |  | 15 |  | 36 |
| 9 | 13 | 20 |  | 16 |  |  |
| 10 | 14 | 21 |  | 17 |  | 37 |
| 11 | 95 | 165 |  | 125 |  | 207 |

Figure 2B

R1C1 Reference Style

| ◢ | A | B | C | D | E | F |
|---|---|---|---|---|---|---|
| 1 | 5 | 12 | | 8 | | 32 |
| 2 | =R[-1]C+1 | =R[-1]C+1 | | =R[-1]C+1 | | =R[-1]C+1 |
| 3 | =R[-1]C+1 | =R[-1]C+1 | | =R[-1]C+1 | | =R[-2]C+1 |
| 4 | =R[-1]C+1 | =R[-1]C+1 | | =R[-1]C+1 | | |
| 5 | =R[-1]C+1 | =R[-1]C+1 | | =R[-1]C+1 | | =R[-2]C+1 |
| 6 | =R[-1]C+1 | =R[-1]C+1 | | =R[-1]C+1 | | |
| 7 | =R[-1]C+1 | =R[-1]C+1 | | =R[-1]C+1 | | =R[-2]C+1 |
| 8 | =R[-1]C+1 | =R[-1]C+1 | | =R[-1]C+1 | | |
| 9 | =R[-1]C+1 | =R[-1]C+1 | | =R[-1]C+1 | | =R[-2]C+1 |
| 10 | =R[-1]C+1 | =R[-1]C+1 | | =R[-1]C+1 | | |
| 11 | =SUM (R[-10]C:R[-1]C) | =SUM (R[-10]C:R[-1]C) | | =SUM (R[-10]C:R[-1]C) | | =SUM (R[-10]C:R[-1]C) |

FINDING UNIQUE FORMULA SETS IN SPREADSHEETS

CROSS-REFERENCE TO RELATED APPLICATIONS

N/A

BACKGROUND

Many types of computer applications exist to help users access and manipulate data, including spreadsheet applications. These applications can also be referred to simply as spreadsheets. Non-limiting examples of spreadsheets include Excel and Lotus 1-2-3.

Spreadsheets are configured to present tables of cells in an arrangement of rows and columns. Each cell may contain a value that has a predefined relationship to one or more other values contained in other cells. Spreadsheets let users define what value or type of data is in each cell and how the different cells depend on one another. These relationships are called formulas. The formulas presented in a spreadsheet can be very simple or complex.

In some instances, a single spreadsheet may contain many different types of formulas which are applied to individual cells and/or whole ranges of cells. Spreadsheets can also span multiple worksheets that are combined into a single workbook, wherein formulas in one worksheet can reference the values contained in one or more other worksheets of the same workbook.

To make a formula, one simply replaces a number in a mathematical relationship with a cell reference. For instance, the spreadsheet formula defined as "=10*B20*C15" would produce a value resulting from the product of ten (10), the value contained in cell B20 (located at column B, row 20) and the value contained in cell C15 (located at column C, row 15). Accordingly, if B20 held the value of five (5) and C15 held the value of twenty (20), the resulting value would be one thousand (1000) (i.e., 10*5*20=1000).

It will be appreciated, with regard to the foregoing example, that cells B20 and C15 might also hold their own formulas, referring to other cells, such that a string of formulas can be chained together. This ability to chain formulas together is what gives spreadsheets their power.

Once a particular formula is created, it is often duplicated in other cells to enable a user to explore the impact of the relationship defined by the formula on other sets of data. To facilitate the deployment of the formula to different cells, spreadsheets are configured with functionality that enables users to copy the formula from one cell to another with a simple gesture such as a select and drag gesture. However, this type of functionality is only applicable to situations in which the formula is copied from one cell to one or more immediately adjacent cells. Otherwise, the user must perform multiple gestures and/or navigate multiple menus to copy and paste the formula to other cells.

Once a formula is entered into a cell, the value resulting from the formula is presented to the user within the cell. Accordingly, the formula is somewhat hidden from the user until the user actually selects or directs focus to the cell. Once selected, the formula is presented in a separate field, such as within the formula field presented with the menu ribbon of the spreadsheet.

Review of formulas is important, to make sure that the formulas are entered correctly and to facilitate any edits that might be needed down the road. However, even with a review field, it can still be somewhat cumbersome to keep track of and review each of the separate formulas entered into a spreadsheet, particularly when the workbook includes one or more worksheets that may each span hundreds, thousands or even more columns and rows.

Sometimes specialized auditing software is used to examine a spreadsheet, to determine which individual formulas are presented within the spreadsheet. This auditing software can be particularly helpful to determine how complex and unwieldy a spreadsheet is and how much time and how many resources are likely required to fully audit the formulas within the spreadsheet. For instance, if it is determined that a spreadsheet has fifty (50) unique formulas, that spreadsheet will likely be considered more difficult to audit than a spreadsheet that only contains three (3) unique formulas.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

As described herein, various methods, systems and storage devices are provided for identifying formulas and a quantity of unique formulas in a spreadsheet or other document, as well as the quantity of unique formula sets that exist within the spreadsheet or other document.

In one embodiment, a computing system uses a parsing tool to parse populated cells in the spreadsheet to identify one or more cells that are determined to contain one or more corresponding formulas. A formula evaluation tool is also used to evaluate each of the one or more corresponding formulas to determine which of the corresponding formulas are functionally unique. Then, for each formula that is determined to be functionally unique, the system detects one or more rectangular ranges of contiguous cells that contain the functionally unique formula. Finally, a unique formula set tool is used to identify a quantity of one or more unique formula sets that are contained within the one or more rectangular ranges of contiguous cells. A marking tool can also be used to generate one or more identifier for each unique formula set so that the unique formula set(s) are discoverable and/or visibly apparent.

Additional features and advantages will be set forth in the description, which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered limiting in scope, embodiments will be described and explained with additional specificity and detail through the use of the accompanying drawings in which.

DETAILED DESCRIPTION

Some aspects of the disclosed embodiments are operable to solve technical problems associated with spreadsheets and utilization of formulas and unique formula sets within spreadsheets.

While existing systems are capable of identifying unique formulas in a spreadsheet, such as with the A1 and R1C1 referencing schemes, no existing system is presently configured to identify unique formula sets corresponding to the unique formulas. Because of this, existing systems are somewhat limited, making it difficult to fully and accurately evaluate and utilize the unique formulas within the spreadsheets or other documents.

In some of the disclosed embodiments, functionally unique formulas are identified according to an R1C1 referencing scheme. Then, subsequent to identifying the unique formulas, the unique formula sets corresponding to the unique formulas are determined. The unique formula sets can then be marked for subsequent reference and/or highlighted for visual inspection and use.

There are various technical effects associated with the disclosed embodiments. By way of example, the disclosed embodiments can be used to provide a more accurate assessment as to the complexity of a spreadsheet, which can be useful for overcoming some of the technical problems associated with auditing spreadsheets.

The disclosed embodiments can also be used to provide enhanced user convenience when interfacing with a spreadsheet, thereby helping to overcome some of the technical problems associated with reviewing and copying formulas within a spreadsheet.

The technical effects related to the disclosed embodiments can also include improved user convenience and efficiency gains through a reduction in the quantity of computer interactions and/or processing that is required to apply a desired function (manually or automatically) to a group of formulas in a spreadsheet.

Various methods, computing systems and storage devices will now be described with reference to the disclosed embodiments for detecting and utilizing unique formulas and corresponding formula sets within spreadsheets.

In this description and in the claims, the term "computing system" is defined broadly as including any device or system (or combination thereof) that includes at least one physical and tangible processor, and a physical and tangible memory capable of having thereon computer-executable instructions that may be executed by the processor.

Figure 1:
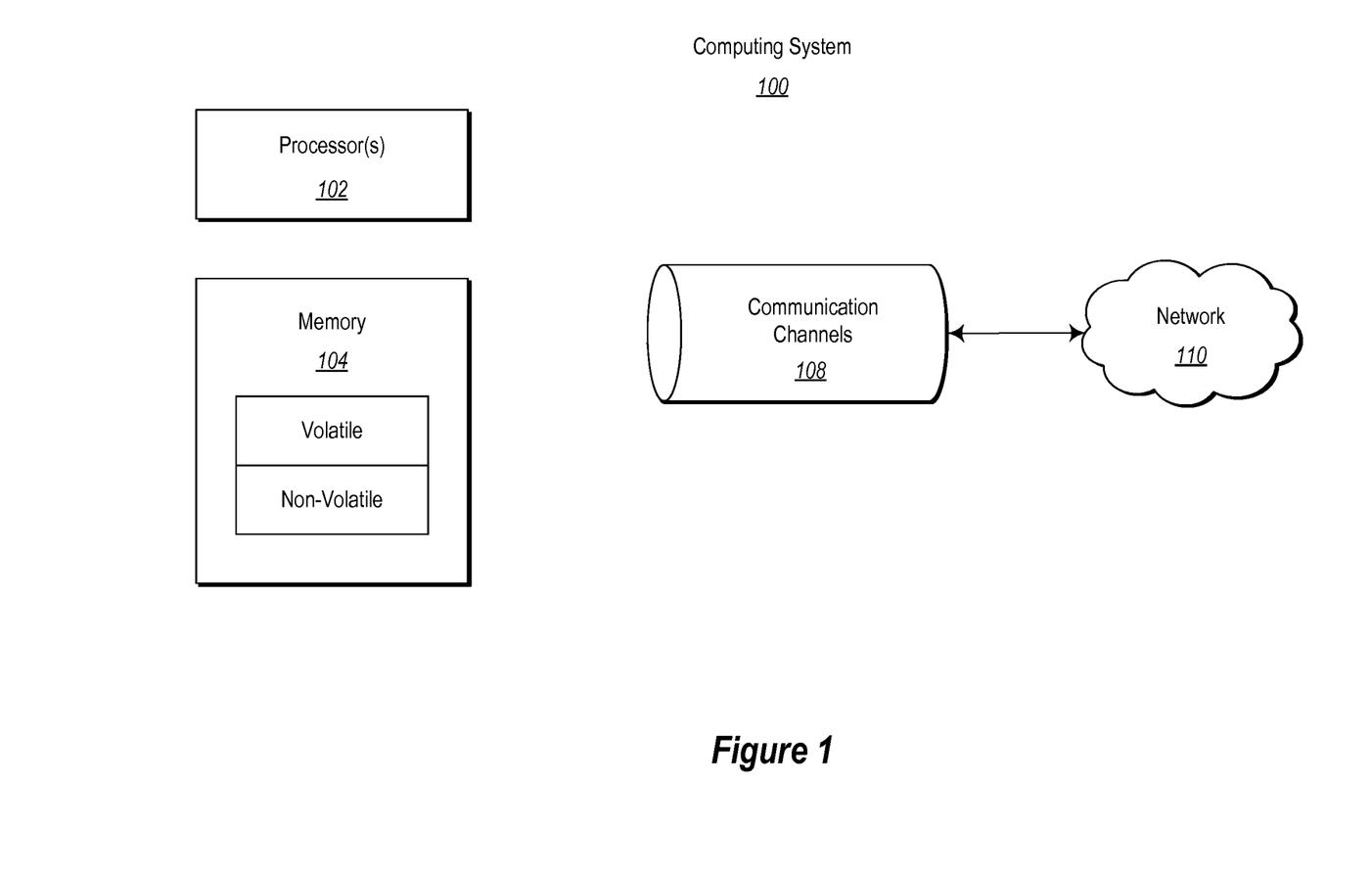
FIG. 1 illustrates an embodiment of a computing system which is usable to implement aspects of the disclosed embodiments.

As illustrated in FIG. 1, in its most basic configuration, the computing system 100 includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

As used herein, the term "executable module" or "executable component" can refer to software objects, routines, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100.

Figure 4:
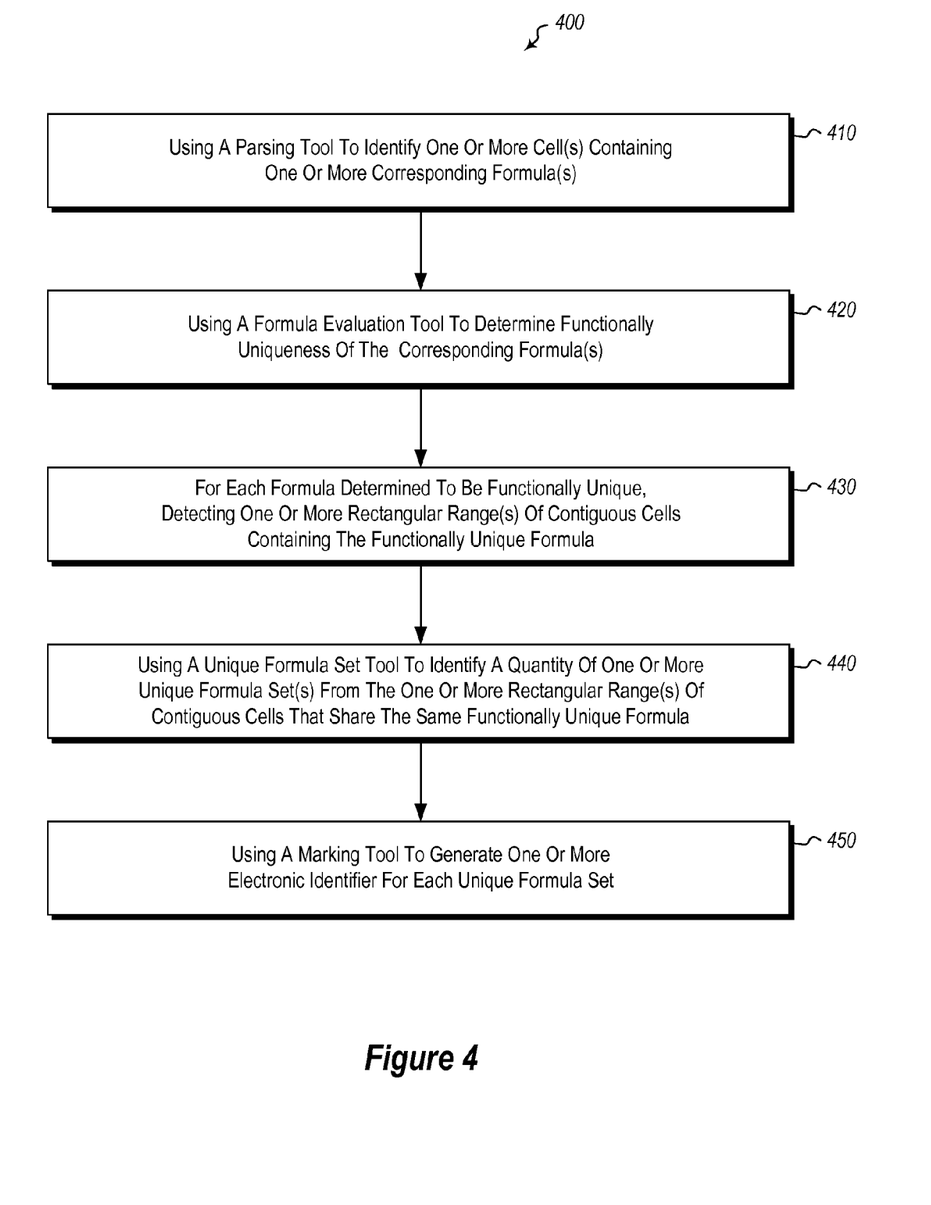
FIG. 4 illustrates a flowchart of at least one method for identifying unique formula sets in a spreadsheet.
Figure 8:
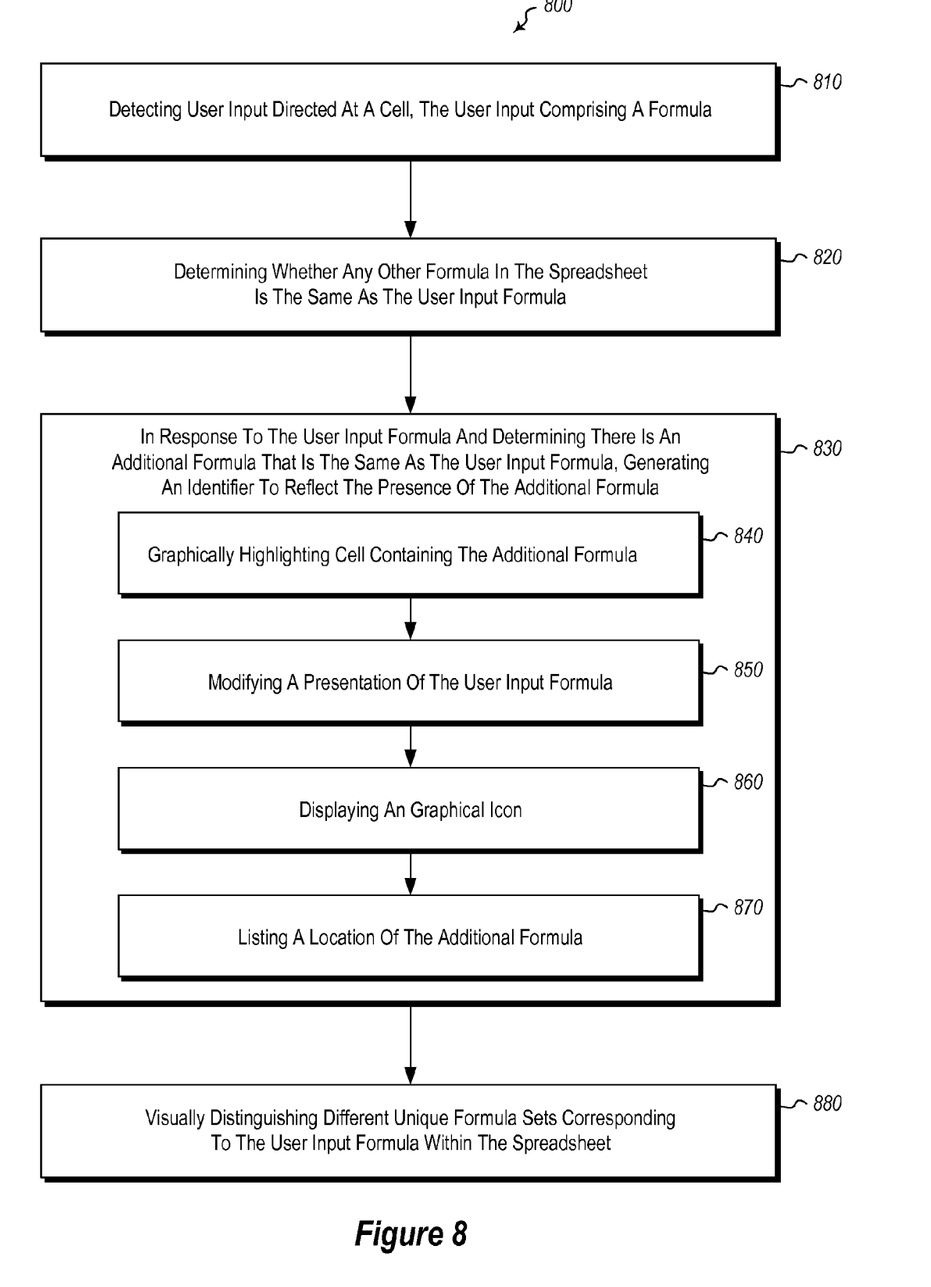
FIG. 8 illustrates a flowchart of at least one method for utilizing unique formula sets in a spreadsheet.
Figure 9:
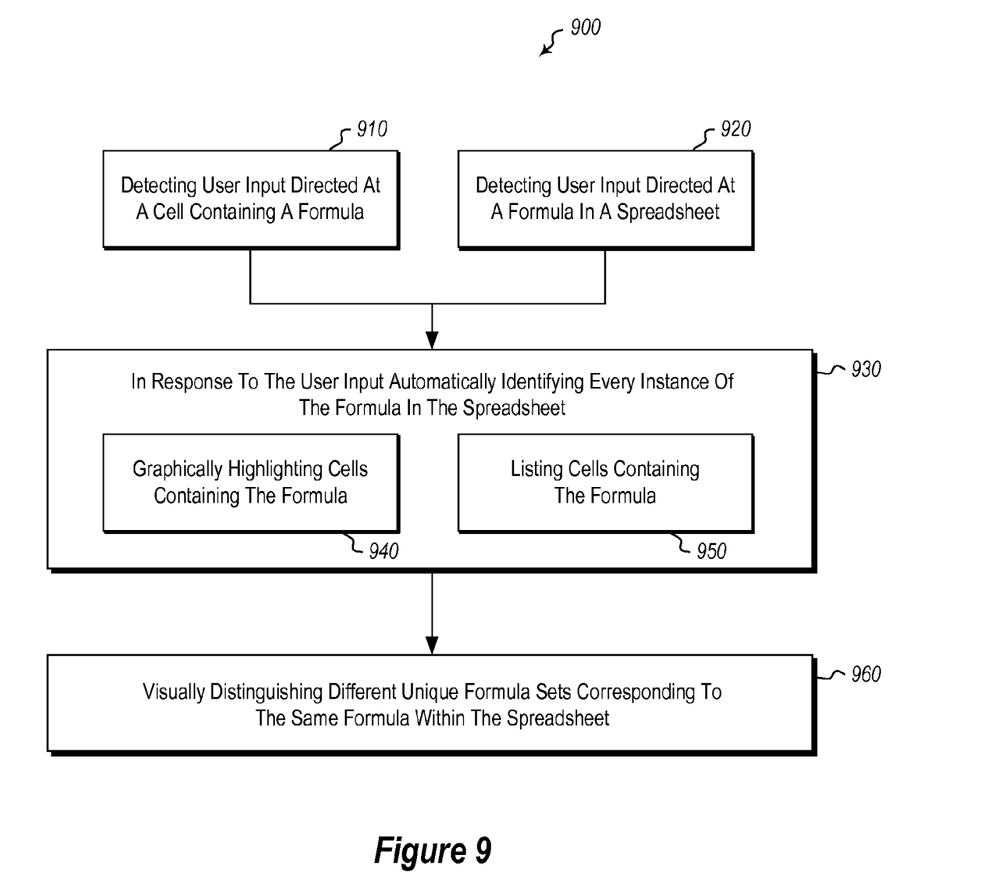
FIG. 9 illustrates a flowchart of at least one method for utilizing unique formula sets in a spreadsheet.

The computer-executable instructions may be used to implement and/or instantiate the modules and functionality described herein, including the parsing tool, the formula evaluation tool, the unique formula set tool and the marking tool described in reference to FIG. 4 and the other functionality described in reference to the disclosed methods of FIGS. 4, 8 and 9.

Computing system 100 may also contain communication channels 108 that allow the computing system 100 to communicate with other message processors over, for example, network 110.

Embodiments described herein may comprise or utilize special-purpose or general-purpose computer system components that include computer hardware, such as, for example, one or more processors and system memory. The system memory may be included within the overall memory 104. The system memory may also be referred to as "main memory," and includes memory locations that are addressable by at least one processing unit 102 over a memory bus in, which case the address location is asserted on the memory bus itself. System memory has been traditionally volatile, but the principles described herein also apply in circumstances in which the system memory is partially, or even fully, non-volatile.

Embodiments within the scope of this disclosure also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical hardware storage devices that store computer-executable instructions and/or data structures. Physical hardware storage devices include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the principles described herein may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Alternatively, or in addition, the functionality described herein can be performed, at least in part, by one or more hardware logic components. For example, and without limitation, illustrative types of hardware logic components that can be used include: Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

When the referenced acts of the disclosed methods are implemented in software, the one or more processors 102 of the computing system 100 perform the acts and direct the operation of the computing system 100 in response to having executed the stored computer-executable instructions defined by the software. Various input and output devices, not illustrated, can be used by the computing system to receive user input and to display output in accordance with the computer-executable instructions.

Various methods for implementing the disclosed embodiments with a computing system, like computing system 100, will now be described.

Figure 2A:
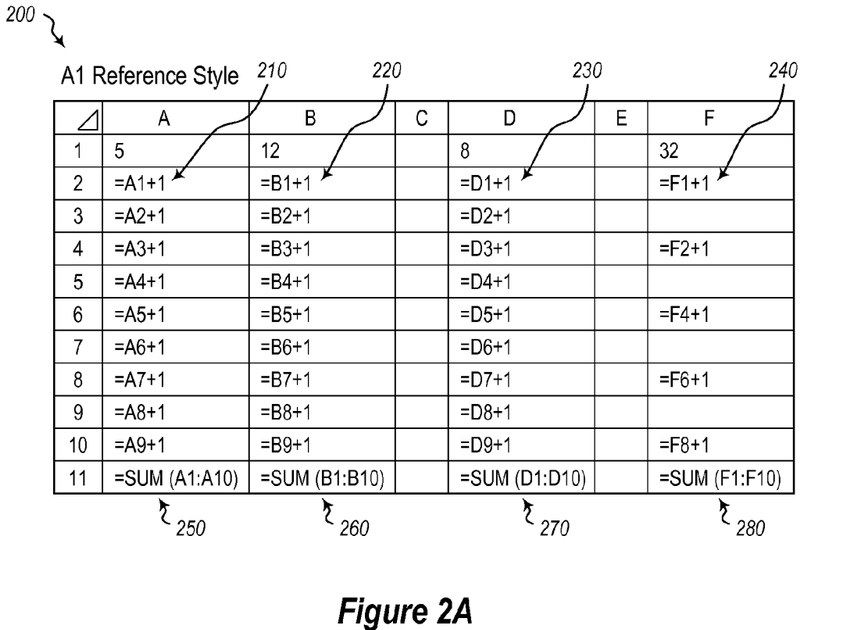
FIG. 2A illustrates an example of an A1 reference style examination of formulas in a spreadsheet.

A description of an A1 referencing scheme is first provided with respect to the illustration of FIG. 2A. As shown, a spreadsheet is populated with a plurality of different fixed values (i.e., a value of five (5) in cell A1, a value of twelve (12) in cell B1, a value of eight (8) in cell D1 and value of thirty-two (32) in cell F1).

Figure 2B:
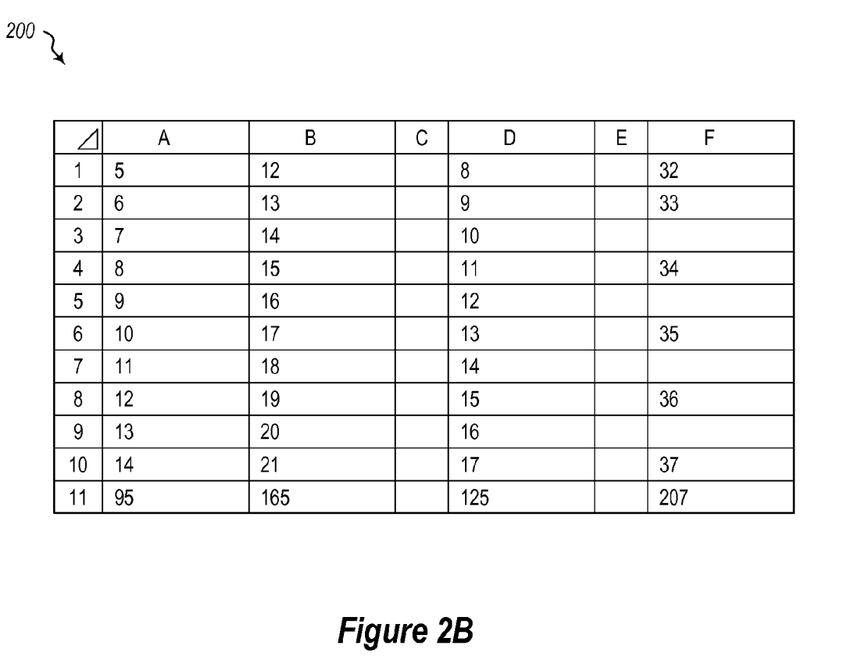
FIG. 2B illustrates a spreadsheet that is populated with values corresponding to the formulas illustrated in FIGS. 2A and 3.

Various other cells in the spreadsheet 200 have also been populated with formulas. In total, there are 36 different formula cells. While the formulas are presently shown in FIG. 2A, it will be appreciated that a user will typically only see the values that result from those formulas, similar to what is shown in FIG. 2B.

Many, or all, of the formulas in the spreadsheet 200 can be individually entered formulas. Alternatively, many of the formulas can also be automatically entered in response to a gesture that drags a first formula to adjacent cells. By way of example, the formula 210 (=A1+1) can be selected and dragged all the way down to cell A10 in a single select and drag gesture. This would result in cells A3 thru A10 being populated with the formulas that are now shown. Similarly, cells B3 thru B10 can be automatically populated with the illustrated formulas by dragging formula 220 down from cell B2 to cell B10. Formula 230 can also be selected and dragged down to cell D10 to populate cells D3 thru D10. Cells F4 thru F10, on the other hand, can be automatically populated by selecting/highlighting the group of cells F2 and F3, collectively, and dragging that grouping down to cell F10.

In the foregoing examples, the formulas were all replicated by gestures that involve a vertical dragging motion through a column. Cell formulas can also be replicated, however, by gestures that drag a formula horizontally along a row. For instance, formula 260 can be created in response to dragging the formula 250 from cell A11 into cell B11.

Multiple separate inputs are required, however, to copy the formula 250 into cells D11 and F11, because these cells are not immediately adjacent to other cells having the same formula. This is one shortcoming associated with the use of formulas in existing spreadsheets, particularly when it is unclear for a user when a formula can or cannot be dragged across several cells to populate the cells with a new or updated formula.

By way of example, if there was a value present in cell C11, the user would not necessarily know whether the value in this cell was a result of the cell having a similar formula to the one found in cell B11 or not. Likewise, it may be difficult for a user to know whether the formula in cell B11 is the same as the formula in cell A11, without performing a separate inspection of each cell. This can be very cumbersome when there are many different formulas to check.

Now, back to the A1 referencing style, it is noted that all of the formulas in cells A2 thru A10, B2 thru B10 and D2 thru D10 are functionally equivalent. In particular, they all require adding the number one (1) to the value of the preceding cell in their column, such that the value presented in cell A2 will be displayed as the number six (6), the value presented in cell A3 will be displayed as the number seven (7), and so forth (as shown in FIG. 2B).

The formulas presented in cells F6, F8 and F10 are also functionally the equivalent. In particular, they require adding the number one (1) to the value of the cell that is found two rows up in the column. By way of further example, the formulas 250, 260, 270 and 280 are also functionally equivalent. In particular, they all require summing the total of all values found in the cells corresponding to rows 1-10 of their same columns, respectively.

Despite the functional equivalence between the formulas, however, A1 referencing requires that each formula is treated as being unique when it is recited differently than any other formula in the spreadsheet. Therefore, according to A1 referencing, the spreadsheet 200 of FIG. 2 will be considered to have thirty-six (36) unique formulas.

Figure 3:
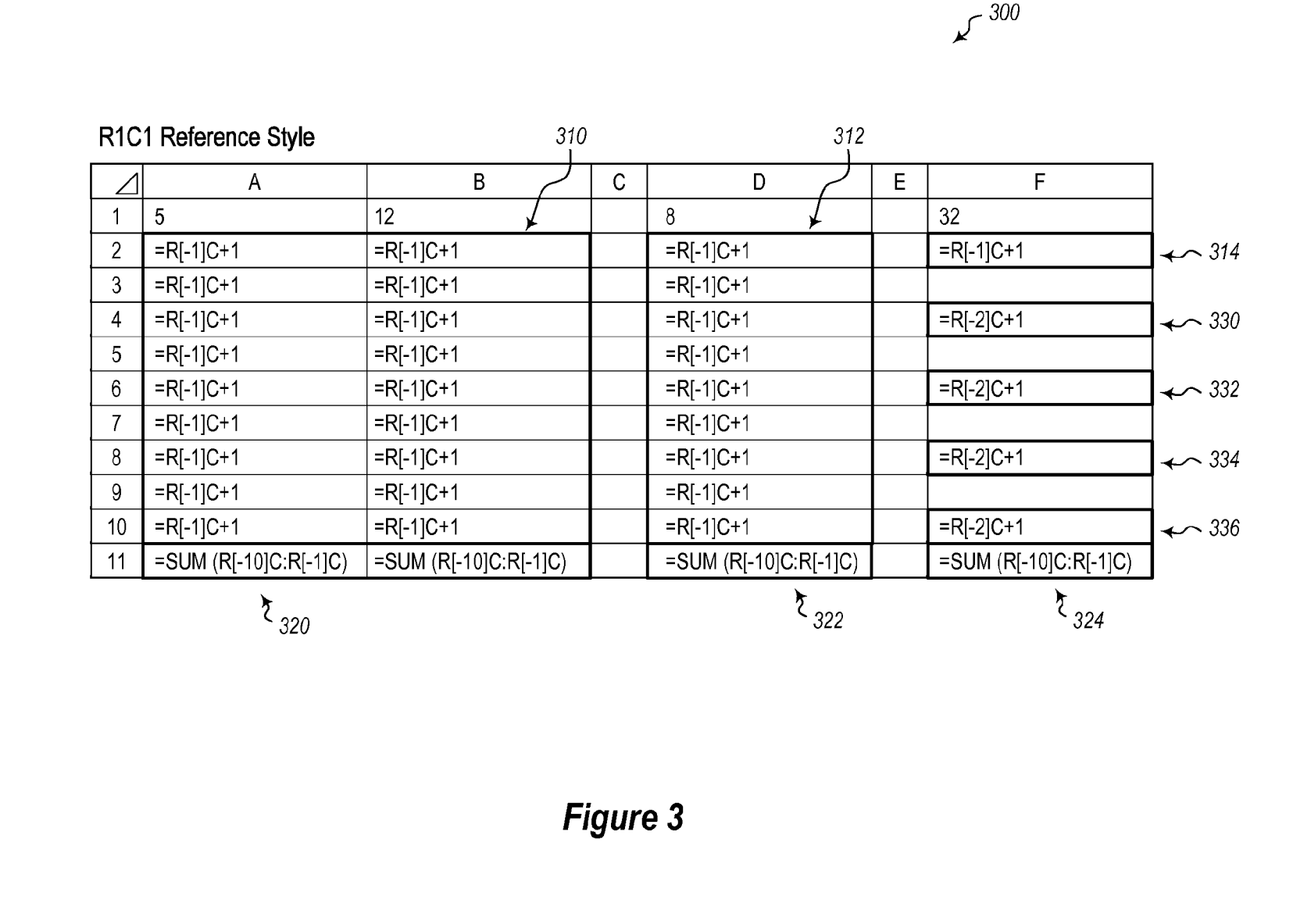
FIG. 3 illustrates an example of an R1C1 reference style examination of formulas in a spreadsheet.

FIG. 3 illustrates another methodology for identifying unique formulas in a spreadsheet. According to this methodology, referred to as R1C1 referencing style, a formula is only unique if it is functionally unique from any other formula in the spreadsheet. To illustrate this methodology, the formulas of FIG. 2A are rewritten in FIG. 3 to reflect their relative functionality.

For instance, all of the formulas found in cells A2 thru A10, B2 thru B10, D2 thru D10, and F2 are written as "=R[−1]C+1." This means the value in each of these cells is the same value as the cell found one row up in the same column, plus the value of one (1). Likewise, formulas in cells F4, F6, F8 and F10 are all rewritten as "=R[−2]C+1," thereby requiring the value in these cells to be the same as the value found two rows up in the same column, plus the value of one (1). The last set of formulas, found in row eleven (11) are also all functionally equivalent. Accordingly, they are rewritten as "=SUM(R[−10]C:R[−1]C)" to reflect their relative functionality (e.g., summing all cells in the preceding 10 rows of their constituent columns). According to this R1C1 methodology, there are only three unique formulas, namely, =R[−1]C+1, =R[−2]C+1 and =SUM(R[−10]C:R[−1]C).

In some instances, the identification of the three unique formulas from the R1C1 referencing style is more accurate for auditing than the A1 referencing style (which found 30 unique formulas for the same data). The reason for this is that it is only really necessary to check the accuracy of the three unique formulas to ensure they are applied correctly in certain circumstances. However, even with R1C1, there is a technical problem resulting in some level of inaccuracy. In particular, due to the complexity of some spreadsheets, it is not clear whether a single formula should be applied the same way when it is presented in in different contexts (e.g., different worksheets, for different sets of data, etc.). For instance, if the formula is found in one grouping of cells, completely separated by some distance from another grouping of cells, it is possible that the two groupings apply to different contexts. Each context may need to be audited separately to verify that the correct formula is being used.

Additionally, if a user wants to copy a revised formula into a plurality of cells containing an incorrect formula, the user presently has no way of knowing the boundaries between which the new formula can be copied, without going into each of the cells to verify which formula is being used in those cells.

The present embodiments can be used to address some of the foregoing technical problems associated with existing spreadsheet systems, by identifying unique formula sets that are associated with the unique formulas. For instance, once the unique formula sets are identified, it is possible to quickly and easily know what the boundaries are for a whole range of cells, within which a formula can be copied through a single drag gesture.

Knowing the quantity of unique formula sets that exist in a spreadsheet can also provide a more accurate assessment of complexity for auditing than was previously possible by only knowing a quantity of unique formulas.

FIG. 4 illustrates a flowchart of at least one method for identifying unique formula sets in a spreadsheet. According to this method, a computing system uses a parsing tool to identify one or more cells in the spreadsheet that are determined to contain one or more corresponding formulas (act 410). This may include parsing every cell in a spreadsheet, including every cell in a plurality of different worksheets, when the spreadsheet comprises a workbook with multiple worksheets. In other embodiments, this may include only parsing cells that are populated and/or that contain certain types of mathematical operators, operands or strings.

A formula evaluation tool is also used to evaluate each of the one or more corresponding formulas to determine which of the corresponding formulas are functionally unique (act 420). This may be accomplished, for example, by using the methodology of R1C1 to determine the relative functionality of each formula. In the instance of the spreadsheet 200 shown in FIG. 2B, this means that thirty-six (36) formula cells would be identified, using the methodology of R1C1 (shown in FIG. 3), of which only three (3) were found to be unique. Although not necessarily preferred, the methodology of A1 could also be used, or another methodology to meet certain needs or desires.

While some existing systems may determine a quantity of unique formulas in a spreadsheet (utilizing A1 or R1C1), no existing systems identify or quantify the unique formula sets corresponding to those formulas. The embodiments of the present disclosure do this by detecting, for each functionally unique formula, one or more rectangular ranges of contiguous cells that contain the functionally unique formula (i.e., finding ranges of cells that are immediately adjacent to other cells having the same functionally equivalent formula) (act 430).

A unique formula set tool is also used to identify a quantity of one or more unique formula sets from the one or more rectangular ranges of contiguous cells that share the same functionally unique formula (act 440). In some instances, described below, this can include identifying a configuration of a smallest quantity of rectangular regions containing the unique formula and in which every cell containing the unique formula is included in the configuration. This smallest quantity of rectangular regions may consist of one cell or include at least two or more contiguous cells.

With reference to FIG. 3, the acts of identifying the rectangular ranges of contiguous cells containing functionally unique formulas and the act of identifying a quantity of unique formula sets from the rectangular regions would result in a finding that spreadsheet 300 has ten (10) separate unique formula sets, identified as set 310, set 312, set 314, set 320, set 322, set 324, set 330, set 332, set 334 and set 336.

It is noted that sets 310, 312, 314 and 320 are all identified as separate sets, because they are not part of a single rectangular range of contiguous cells that contain only the functionally unique formula. Likewise, sets 320, 322 and 324 are considered separate unique formula sets, even though they are in the same row, because it is not possible to circumscribe all of these cells into a single rectangular range of contiguous cells in which each cell in the rectangular range contains the functionally unique formula. The same is true of sets 330, 332, 334 and 336, which are all sequentially listed in the same column.

After the unique formula sets are identified, they can be marked by a marking tool to generate one or more identifier for each unique formula set (act 450). The identifier can comprise metadata, index data or graphical objects that are visible to the user.

In one embodiment, each of the unique formula sets are highlighted different colors (one color, shading or fonts for each cell containing the unique formula set), in response to user input prompting the identification. For instance, in FIG. 5, a spreadsheet 500 is shown that includes a plurality of different unique formula sets (i.e., 510, 512, 514, 516, 520, 530, 540, 542, 550 and 560). Each of these different formula sets can be a different color, shading or font.

Figure 5:
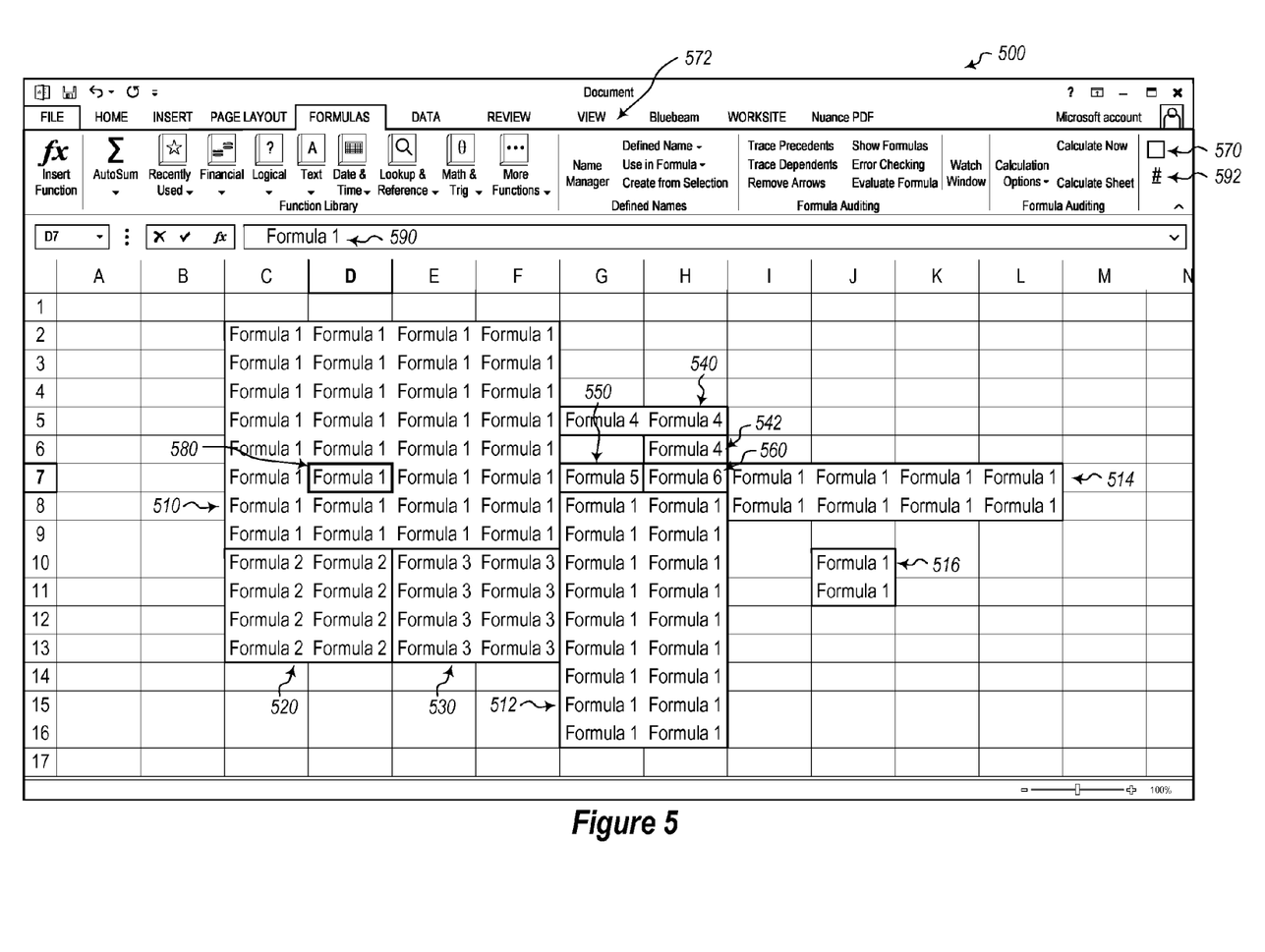
FIG. 5 illustrates a spreadsheet interface with a table of cells arranged in columns and rows and a plurality of different unique formula sets as well as a formula review field with a menu ribbon.

As reflected, the unique formula sets may each correspond to different formulas, or a same formula, such that at least two unique formula sets share the functionally unique formula in common. The distinction between the different types of formula sets can also be reflected with similar, yet different, highlighting (e.g., different tones or shades of the same color). For instance, by way of example, the formula sets 510, 512, 514 and 516, which all correspond to formula 1, may all be shaded different tones of green, whereas unique formula sets 540 and 542, which both correspond to formula 4, may all be different shades of blue.

In some instances the marking includes visually identifying the functionally unique formula for each unique formula set in the spreadsheet. This may include highlighting every corresponding cell in a single worksheet and/or every corresponding cell in a plurality of different worksheets of a single workbook.

User input that is operable to cause the triggering of the foregoing functionality can be a simple selection from a menu icon or a command. In some instances, the menu icon is presented within the main menu options of a spreadsheet, such as icon 570, which can be presented within ribbon 572 (or a related menu) of the spreadsheet 500. In other instances, the icon 570 is presented to a user in a pop-up when the user hovers the cursor 580 over or otherwise selects or directs focus to a particular cell (e.g., cell D7) containing the formula.

In yet other instances, only selected unique formula sets are highlighted. For instance, when a user selects the formula icon 570, a particular cell containing a formula, or when the user enters the formula in a formula field (e.g., field 590), the system may restrictively highlight only the unique formula sets containing the corresponding formula currently identified or focused on. For instance, when formula 1 is selected or input, a user may be presented with the unique formula set configuration shown in FIG. 7. This may include fading or omitting the content/formulas shown in the other cells of the spreadsheet 700.

The marking of unique formula sets can also include rendering output comprising a specific number reflecting the quantity of unique formula sets in the spreadsheet. This is particularly useful for auditing systems/processes. The number can be presented to a user in the form of numerical data (e.g., data 592) in response to selecting icon 570 or in response to other user input. Auditing software can also obtain the quantity of unique formula sets from metadata and other data contained in one or more data fields associated with and/or attached to the spreadsheet.

In yet other embodiments, the disclosed embodiments include generating an interface object or new interface that identifies a quantity of total formula cells, a quantity of unique formula sets and/or a quantity of unique formulas, in response to user input.

Figure 6:
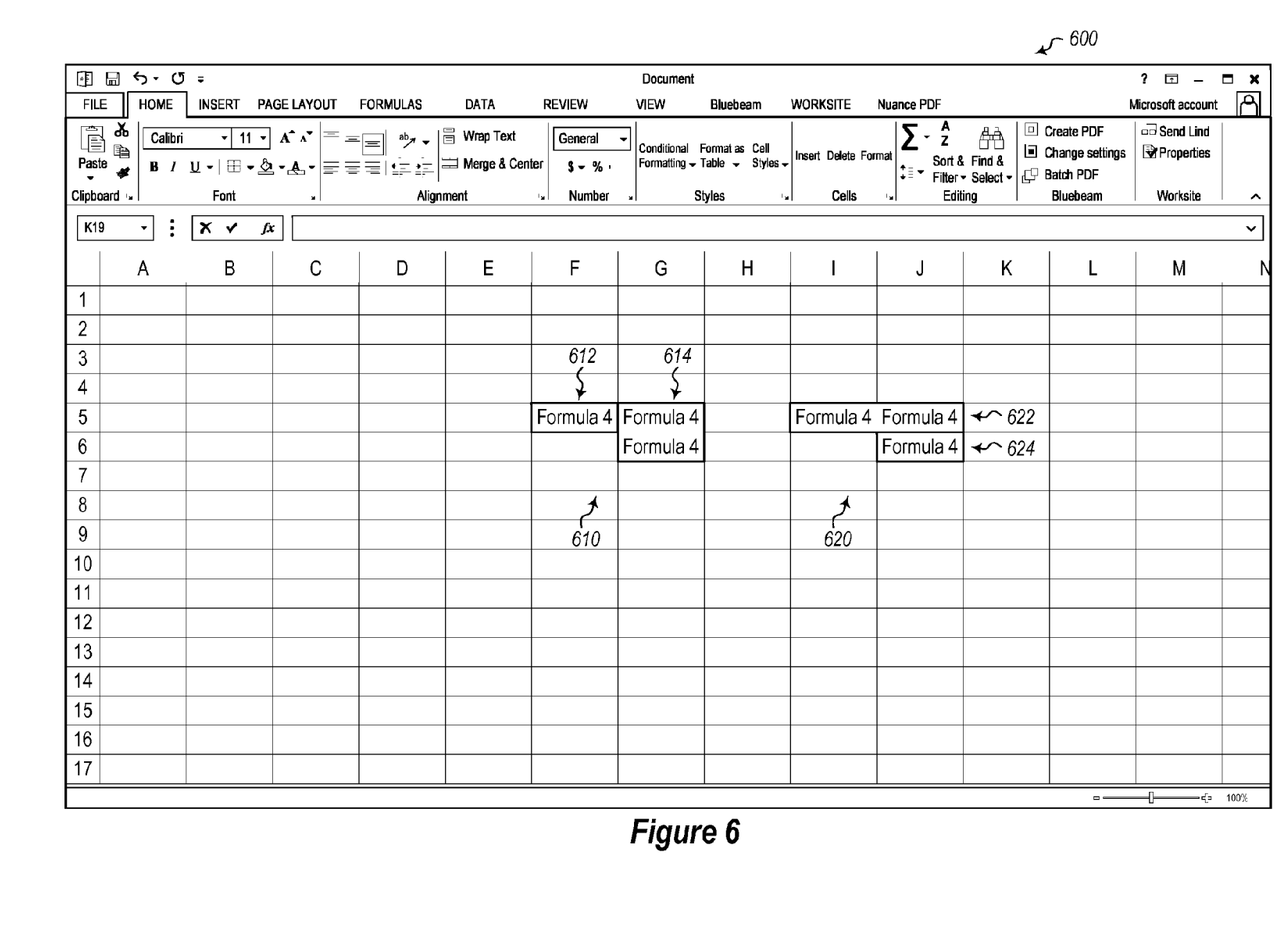
FIG. 6 illustrates a spreadsheet interface with a table of cells arranged in columns and rows and two different configurations of unique formula sets.

Attention will now be directed to FIG. 6, which further illustrates some different ways in which the unique formula sets can be identified and marked. As illustrated, a spreadsheet 600 includes two different groupings of unique formula sets (i.e., grouping 610 and grouping 620), generally related to the formula sets found in cells G5, H5 and H6 of spreadsheet 500 in FIG. 5.

As shown, grouping 610 and 620 each comprises a pair of unique formula sets corresponding to the formula 4. However, the formula sets in each grouping are identified and visually presented with different configurations. For example, grouping 610 includes formula sets 612 and 614 that are defined by rectangular ranges configured along columnar or vertical alignments. Grouping 620, on the other hand, includes formula sets 622 and 624 defined by rectangular ranges configured by horizontal or row alignments. A user can define which configuration option(s) will be utilized, by providing user input through menu options and/or by relying on default settings.

Figure 7:
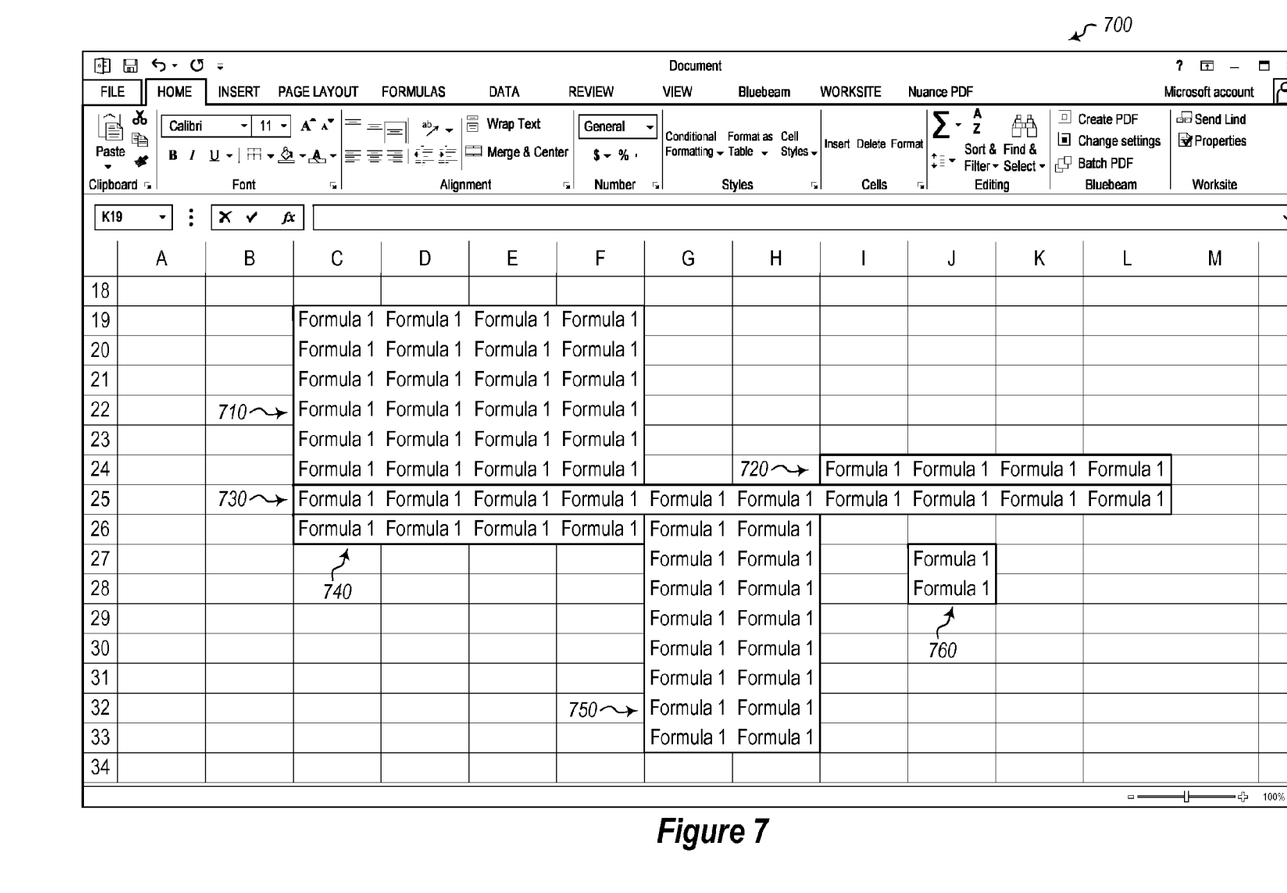
FIG. 7 illustrates a spreadsheet interface with a table of cells arranged in columns and rows and a plurality of different unique formula sets.

FIG. 7 illustrates another embodiment of a spreadsheet 700, in which various unique formula sets are identified. These formula sets, identified as sets 710, 720, 730, 740, 750 and 760, are each configured as separate rectangular ranges of contiguous cells containing a same functionally equivalent formula. However, it is noted that the quantity of unique formula sets defined by this configuration is six (6), which is more than it needs to be. For instance, FIG. 5 illustrates a spreadsheet 500 having a similar presentation of cells containing formula 1. However, in FIG. 5, the unique formula sets corresponding to formula 1 are limited to four (4), namely, sets 510, 512, 514 and 516.

The identification of unique formula sets shown in FIG. 7 may comprise a row first and column second analysis, in which all contiguous cells in a row containing a formula are identified and then the rectangular range is defined by adding any additional sets of cells below that row that contain that formula only when the following row has an exactly equal number of cells containing the formula and that are immediately adjacent to the cells in the first row.

However, a column first and row second analysis could also be used by identifying all cells containing a same formula in a particular column and then adding additional cells to that range from the adjacent column(s) when the adjacent column(s) contain an equal number of cells containing the formula as in the particular column and which are immediately adjacent to the cells in the particular column that contain the same formula. This would achieve the result shown in FIG. 5.

The foregoing processes may be desired in certain circumstances to expedite the disclosed processes of identifying unique formula sets without having to perform other refined processing.

In other embodiments, both of the foregoing processes and/or other processes are performed to determine a fewest quantity of unique formula sets for each unique formula.

One additional process that can be used includes identifying at least two separate rectangular ranges of contiguous cells that share the same functionally unique formula (e.g., formula 1) and that each fail to share any common borders, such that at least one row or column exists between each of the at least two separate rectangular ranges of contiguous cells. In this instance, each of the separate rectangular ranges of contiguous cells that shares the functionally unique formula and that fails to share any common borders is identified as a separate unique formula set. (e.g., set 516 and 514).

In another embodiment, the process of identifying the quantity of one or more unique formula sets includes identifying one or more connecting rectangular ranges of contiguous cells in direct contact with the single unique formula set, wherein each cell of the one or more connecting rectangular ranges of contiguous cells also contains the functionally unique formula. Each additional range of the connecting rectangular ranges is also included as part of the single unique formula set when it is determined that every cell within a rectangular boundary circumscribing the first rectangular range and the additional range contains the functionally unique formula. This may include a process of omitting or excluding any particular range of the connecting rectangular ranges from the single unique formula set when it is determined that every cell within a rectangular boundary circumscribing the first rectangular range and the particular range fails to contain the functionally unique formula.

With regard to the foregoing, the one or more connecting rectangular ranges of contiguous cells are determined to be in direct contact with the single unique formula set when a first cell from the one or more connecting rectangular ranges is directly adjacent to a second cell in the single unique formula set, such that a common border exists between the first and second cells in either a horizontal or vertical direction, with no additional cell positioned between the first and second cell.

In many embodiments, each of the one or more unique formula sets is a non-overlapping unique formula set, such that each cell of the one or more unique formula sets is only present in a single one of the unique formula sets. In other embodiments, unique formula sets may overlap when the formula sets are defined by partial formulas and some sets share the same partial formulas. This can be beneficial for some auditing systems.

Attention is now directed to FIG. 8, which illustrates another flowchart 800 of a method for identifying and utilizing unique formulas and unique formula sets. In this embodiments, a user provides input identifying a formula (act 810). This can be made explicit by typing a formula in a cell or field, or made implicit by highlighting, selecting or focusing on a formula.

Next, a determination is made as to whether there are any other formulas in the spreadsheet that are the same (act 820). This process, as well as all other disclosed processes, can occur in real-time, such as by parsing the spreadsheet with a background thread.

The user is then notified of the existence of any other functionally equivalent formula and/or unique formula set containing the functionally unique formula with one or more identifier (act 830). As indicated above, this can include presenting various forms of output. In some instances, the output includes graphically highlighting the corresponding cells (act 840), modifying a presentation of the user input formula (act 850) in the formula field, a cell or another location, displaying icons (act 860) and/or presenting a listing of locations where the functionally equivalent formula is found (e.g., worksheets, columns, rows, cells, etc.).

Different unique formula sets can also be distinguished to reflect the boundaries of the unique formula set to the user (act 880). This can be particularly useful when the user is attempting to copy a formula to the entire set through a single select and drag gesture.

The last flowchart 900, shown in FIG. 9, illustrates another method for identifying and utilizing unique formulas and unique formula sets. In this embodiment, user input is detected at a cell containing a formula (act 910). Alternatively, other user input can be detected that is directed to a formula in a spreadsheet (act 920), such as by selecting a formula from a menu or by typing or selecting a formula in a formula field.

Then, in response to the user input, the system automatically identifies every instance of the formula in the spreadsheet (act 930). This may include graphically highlighting cells containing the formula (act 940) and/or by listing the cells containing the formula. The different unique formula sets can also be visually distinguished (act 960), as described above, with location listings and/or graphical highlighting.

It will be appreciated that the technical features of the disclosed embodiments can be used to facilitate the identification and use of unique formulas and unique formula sets in a spreadsheet in such a way as to help address some of the technical problems that are typically associated with spreadsheet interfacing and auditing, as described above.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims. Accordingly, all changes which come within the meaning and range of equivalency of the claims are to be embraced within their scope.

What is claimed is:

1. A computing system comprising:
   at least one processor;
   at least one hardware storage device having stored computer-executable instructions which, when executed by the at least one processor, implement a method for determining unique formula sets in a spreadsheet, the method comprising:
   using a parsing tool to parse populated cells in the spreadsheet to identify one or more cells that are determined to contain one or more corresponding formulas;
   using a formula evaluation tool to evaluate each of the one or more corresponding formulas to determine which of the corresponding formulas are functionally unique;
   for each formula that is determined to be functionally unique, detecting one or more rectangular ranges of contiguous cells that each contain the functionally unique formula;
   identifying a smallest quantity of one or more unique formula sets from the one or more rectangular ranges that are non-overlapping;
   generating output comprising a numeric number that identifies the smallest quantity of the one or more unique and non-overlapping formula sets; and
   using a marking tool to generate one or more identifier for each unique formula set.

2. The computing system of claim 1, wherein the one or more identifier includes metadata that is attached to the spreadsheet and that is discoverable by spreadsheet auditing software.

3. The computing system of claim 1, wherein the one or more identifier visually distinguishes each unique formula set.

4. The computing system of claim 3, wherein the identifier includes a highlighting or coloring of each unique formula set that distinguishes the unique formula set from one or more other unique formula sets identified in the spreadsheet document.

5. The computing system of claim 3, wherein the method further includes visually identifying the functionally unique formula for each unique formula set in the spreadsheet document.

6. The computing system of claim 3, wherein at least two unique formula sets share the functionally unique formula in common.

7. The computing system of claim 6, wherein the method further includes:
   identifying at least two separate rectangular ranges of contiguous cells that share the functionally unique formula in common and that each fail to share any common borders, such that at least one row or column exists between each of the at least two separate rectangular ranges of contiguous cells, and
   identifying each of the separate rectangular ranges of contiguous cells that shares the functionally unique formula and that fails to share any common borders as a separate unique formula set.

8. The computing system of claim 1, wherein identifying the quantity of one or more unique formula sets includes:
   defining a first rectangular range of contiguous cells in which each corresponding cell contains the functionally unique formula as a single unique formula set.

9. The computing system of claim 8, wherein identifying the quantity of one or more unique formula sets further includes:
   identifying one or more connecting rectangular ranges of contiguous cells in direct contact with the single unique formula set, wherein each cell of the one or more connecting rectangular ranges of contiguous cells also contains the functionally unique formula;
   including each additional range of the connecting rectangular ranges as part of the single unique formula set when it is determined that every cell within a rectangular boundary circumscribing the first rectangular range and the additional range contains the functionally unique formula; and
   excluding any particular range of the connecting rectangular ranges from the single unique formula set when it is determined that every cell within a rectangular boundary circumscribing the first rectangular range and the particular range fails to contain the functionally unique formula.

10. The computing system of claim 9, wherein the one or more connecting rectangular ranges of contiguous cells are determined to be in direct contact with the single unique formula set when a first cell from the one or more connecting rectangular ranges is directly adjacent to a second cell in the single unique formula set, such that a common border exists between the first and second cells in either a horizontal or vertical direction, with no additional cell positioned between the first and second cell.

11. The computing system of claim 9, wherein identifying the quantity of one or more unique formula sets further includes:
   identifying every cell containing the unique formula within the spreadsheet; and
   identifying a configuration of a smallest quantity of rectangular regions containing the unique formula and in which every cell containing the unique formula is included in the configuration.

12. The computing system of claim 1, wherein evaluating each of the one or more corresponding formulas to determine which of the corresponding formulas is functionally unique is performed by using an R1C1 reference style evaluation.

13. The computing system of claim 1, wherein said parsing includes evaluating every cell in the spreadsheet document.

14. The computing system of claim 13, wherein the spreadsheet document includes a plurality of worksheets.

15. The computing system of claim 1, wherein the parsing is performed in real-time, in response to detecting user input entering a formula into a cell of the spreadsheet.

16. The computing system of claim 1, wherein the method further includes notifying a user of the existence of another unique formula set containing the functionally unique formula in response to determining that the user input defines the functionally unique formula.

17. The computing system of claim 1, wherein the method further includes generating an interface that identifies a quantity of total formula cells, a quantity of unique formula sets, and a quantity of unique formulas.

18. The computing system of claim 1, wherein each of the one or more unique formula sets is a non-overlapping unique formula set, such that each cell of the one or more unique formula sets is only present in a single one of the unique formula sets.

19. The computing system of claim 1, wherein the method further includes identifying the smallest quantity of the one or more unique formula sets using at least one of (1) the row first and column second method or (2) the column first and the row second method.

20. The computing system of claim 1, wherein the method further includes identifying the smallest quantity of the one or more unique formula sets using and comparing both of (1) the row first and column second method and (2) the column first and the row second method.

21. One or more hardware storage device having stored computer-executable instructions which, when executed by the at least one hardware processor of a computing system, implement a method for determining unique formula sets in a spreadsheet, the method comprising:

using a parsing tool to parse populated cells in the spreadsheet to identify one or more cells that are determined to contain one or more corresponding formulas;

using a formula evaluation tool to evaluate each of the one or more corresponding formulas to determine which of the corresponding formulas are functionally unique;

for each formula that is determined to be functionally unique, detecting one or more rectangular ranges of contiguous cells that each contain the functionally unique formula;

identifying a smallest quantity of one or more unique formula sets from the one or more rectangular ranges that are non-overlapping;

generating output comprising a numeric number that identities the smallest quantity of the one or more unique and non-overlapping formula sets; and visually identifying the one or more unique formula sets.

22. A computer-implemented method for determining unique formula sets in a document, the method being implemented by a computing system that includes at least one processor that executed computer-executable instructions to implement the method, the method comprising:

using a parsing tool to parse populated cells in the document to identify one or more cells that are determined to contain one or more corresponding formulas;

using a formula evaluation tool to evaluate each of the one or more corresponding formulas to determine which of the corresponding formulas are functionally unique;

for each formula that is determined to be functionally unique, detecting one or more rectangular ranges of contiguous cells that each contain the functionally unique formula;

identifying a smallest quantity of one or more unique formula sets from the one or more rectangular ranges that are non-overlapping; and generating output comprising a numeric number that identifies the smallest quantity of the one or more unique and non-overlapping formula sets.

* * * * *